United States Patent
Isobe et al.

(10) Patent No.: US 10,027,821 B2
(45) Date of Patent: Jul. 17, 2018

(54) BILLING SYSTEM, BILLING APPARATUS, AND BILLING METHOD

(71) Applicant: NTT DOCOMO, INC., Tokyo (JP)

(72) Inventors: Shin-ichi Isobe, Tokyo (JP); Katsutoshi Nishida, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/396,395

(22) PCT Filed: Apr. 18, 2013

(86) PCT No.: PCT/JP2013/061510
§ 371 (c)(1),
(2) Date: Aug. 14, 2015

(87) PCT Pub. No.: WO2013/161670
PCT Pub. Date: Oct. 31, 2013

(65) Prior Publication Data
US 2015/0350459 A1    Dec. 3, 2015

(30) Foreign Application Priority Data

Apr. 25, 2012 (JP) .................................. 2012-100273

(51) Int. Cl.
*H04M 11/00* (2006.01)
*H04M 15/00* (2006.01)
(Continued)

(52) U.S. Cl.
CPC ........ *H04M 15/80* (2013.01); *H04L 12/1403* (2013.01); *H04M 15/43* (2013.01);
(Continued)

(58) Field of Classification Search
CPC ... H04W 4/24; H04M 2215/32; H04M 15/00; H04M 2215/2026; H04M 17/00
See application file for complete search history.

(56) References Cited

U.S. PATENT DOCUMENTS 7,123,702 B1 *   10/2006   Pershan ................... 379/114.01
7,366,494 B1 *   4/2008    Ham ............................ 455/406
(Continued)

FOREIGN PATENT DOCUMENTS

EP        0917381 A2      5/1999
JP     2004274416 A       9/2004
(Continued)

OTHER PUBLICATIONS

Extended Search Report issued in corresponding European application No. 13781996.7, dated Dec. 3, 2015 (8 pages).
(Continued)

*Primary Examiner* — Moustapha Diaby
(74) *Attorney, Agent, or Firm* — Osha Liang LLP

(57) ABSTRACT

Provided are a billing system, a billing apparatus, and a billing method capable of billing for device-to-device direct communication (D2D communication) performed using a radio access network such as LIE. A terminal 400A sends a billing apparatus 200 billing-related information to be used to bill for direct communication. The billing apparatus 200 acquires the billing-related information from the radio communication terminal and generates billing information on the direct communication based on the billing-related information acquired.

7 Claims, 6 Drawing Sheets

(51) Int. Cl.
  *H04W 76/14* (2018.01)
  *H04L 12/14* (2006.01)
  *H04W 4/24* (2018.01)
  *H04W 76/02* (2009.01)

(52) U.S. Cl.
  CPC ........... *H04W 4/24* (2013.01); *H04W 76/023* (2013.01); *H04W 76/14* (2018.02)

(56) References Cited

U.S. PATENT DOCUMENTS

| | | | | |
|---|---|---|---|---|
| 2005/0009499 | A1* | 1/2005 | Koster | H04M 15/00 455/406 |
| 2007/0087727 | A1* | 4/2007 | Tseitlin et al. | 455/406 |
| 2008/0009305 | A1* | 1/2008 | Li | H04L 5/0051 455/522 |
| 2010/0128701 | A1* | 5/2010 | Nagaraja | H04W 76/02 370/338 |
| 2010/0190469 | A1* | 7/2010 | Vanderveen et al. | 455/406 |
| 2011/0069702 | A1* | 3/2011 | Oktay | H04L 65/1046 370/352 |
| 2012/0014334 | A1* | 1/2012 | Oh et al. | 370/329 |

FOREIGN PATENT DOCUMENTS

| | | |
|---|---|---|
| JP | 2005-33536 A | 2/2005 |
| JP | 2005-103151 A | 4/2005 |
| JP | 2009-516418 A | 4/2006 |
| JP | 2006-333449 A | 12/2006 |
| JP | 2008104115 A | 5/2008 |
| WO | 2007/055623 A1 | 5/2007 |

OTHER PUBLICATIONS

International Search Report for corresponding International Application No. PCT/JP2013/061510, dated May 28, 2013 (1 page).
Written Opinion for corresponding International Application No. PCT/JP2013/061510, dated May 28, 2013 (3 pages).
B. Bertenyi; "Key drivers for LTE success: Services Evolution;" 3GPP Seminar, LTE Asia; Sep. 6, 2011 (15 pages).
Office Action issued in corresponding Japanese Application No. 2012-100273, dated May 31, 2016 (6 pages).
Office Action issued in corresponding European Application No. 13781996.7, dated Apr. 3, 2017 (6 pages).
Office Action issued in corresponding Japanese Application No. 2017-003467, dated May 23, 2017 (4 pages).
Office Action issued in corresponding Japanese Application No. 2012-100273, dated Dec. 20, 2016 (6 pages).

* cited by examiner

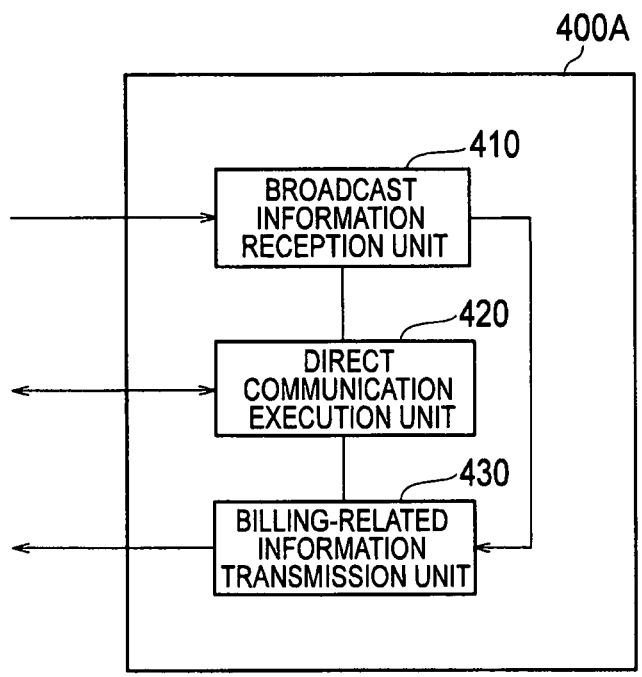
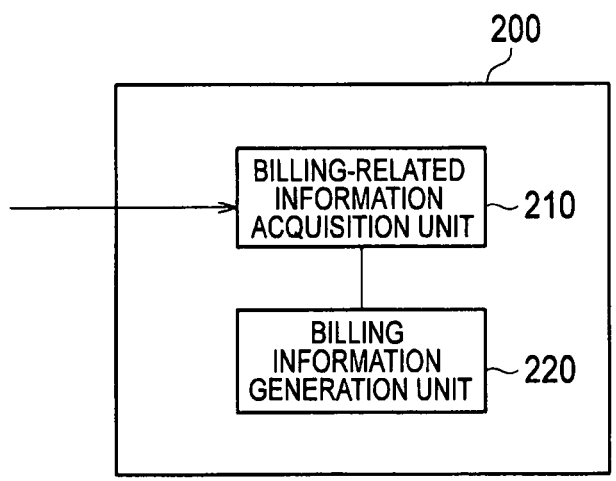

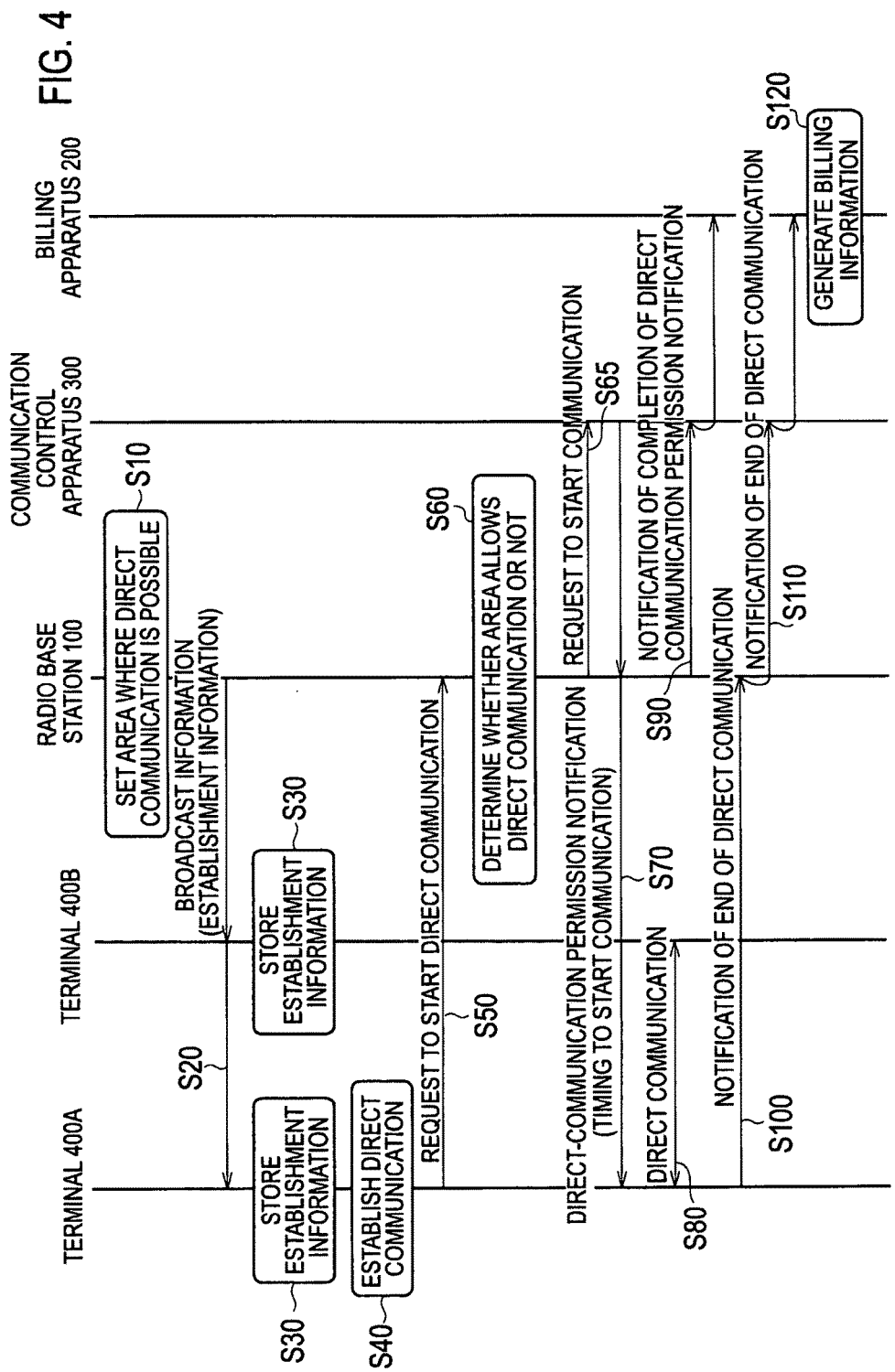

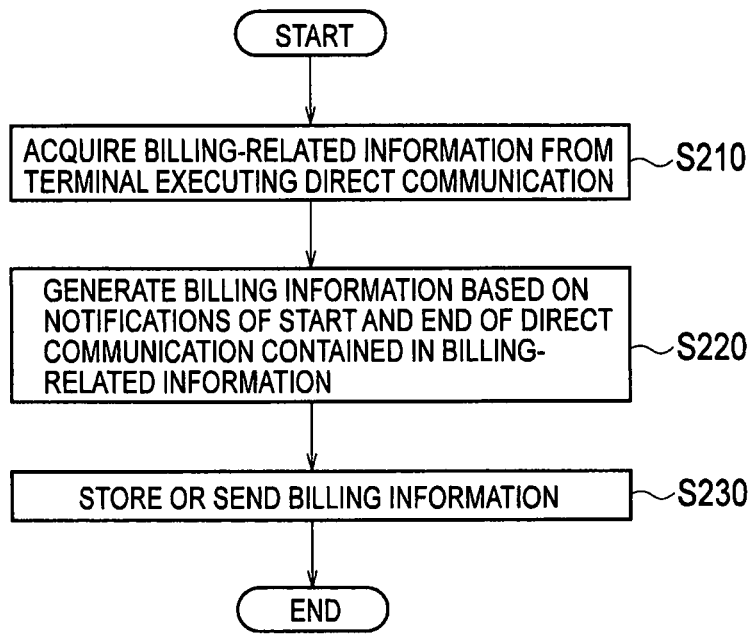
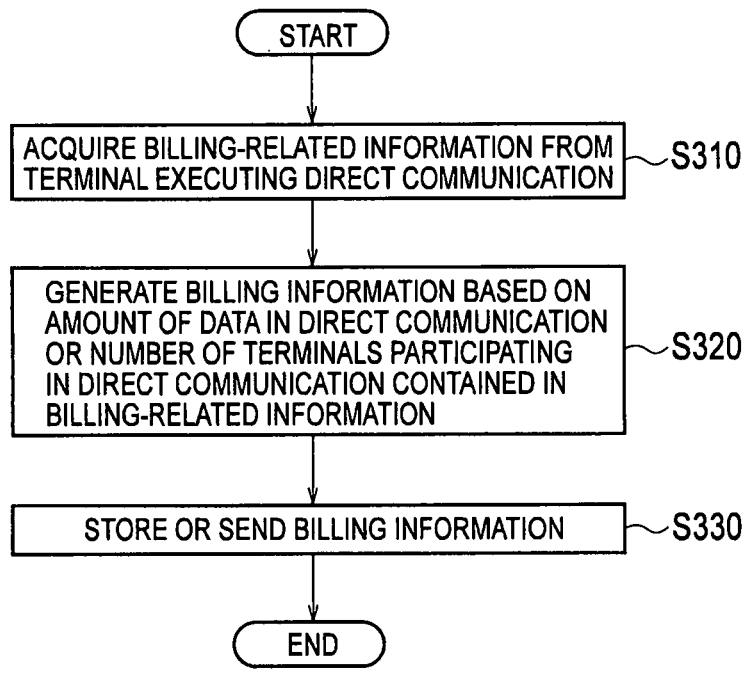

BILLING SYSTEM, BILLING APPARATUS, AND BILLING METHOD

TECHNICAL FIELD

The present invention relates to a billing system, a billing apparatus, and a billing method used for management of billing for direct communication performed between a radio communication terminal and another radio communication terminal without involving a radio access network.

BACKGROUND ART

Conventionally, Bluetooth (registered trademark) and ad-hoc mode of a wireless LAN are known as so-called Device-to-Device (D2D) communication that is a radio communication method in which multiple radio communication terminals (sometimes referred to simply as terminals hereinbelow) perform radio communication with each other directly without involving a radio base station or an access point. Such a radio method achieves short-range radio communication by using relatively-low radio transmission power. For this reason, it is difficult to use this radiocommunication method when the inter-terminal distance is long. In addition, in such a radio communication method, the radio transmission capacity is limited compared to a radio access network (e.g., UTRA (3G), E-UTRA (LTE), or GERAN (2G)) managed by a telecommunications carrier.

Thus, it is being discussed to achieve the D2D communication by using a radio access network provided by a telecommunications carrier (e.g., Non-patent document 1).

In the case of using a radio access technology employed in such a radio access network, the terminals uses a frequency band which the telecommunications carrier is licensed to use by supervisory authorities, and therefore are enabled to output higher radio transmission power and achieve long-distance, large-capacity D2D communication without using resources on the network side such as a radio base station. Such a characteristic is considered particularly effective when the network side such as the radio base station is devastated by an earthquake or the like. In addition, when the D2D communication is achieved using the frequency band used in a radio access network managed by a telecommunications carrier, the terminals can perform the D2D communication without being equipped with a module for another type of radio communication (e.g., Bluetooth (registered trademark)), which offers advantages such as cost and size reductions for the terminals.

PRIOR ART DOCUMENT

Non-Patent Document

Non-patent document 1: "Key drivers for LTE success: Services Evolution," September 2011, 3GPP, Internet URL: http://www.3gpp.org/ftp/Information/presentations/presentat ions_2011/2011_09_LTE_Asia/2011_LTE-Asia_3GPP_Service_evolution.pdf

SUMMARY OF THE INVENTION

However, performing D2D communication by using the radio access network described above has the following problem. Specifically, the above radio access technology is on the assumption that radio communication involves a radio base station. Thus, when a terminal performs D2D communication, the radio access network side cannot know information on billing for the communication, such as the start and end of the D2D communication, the type of the communication, the amount of data used, or the time spent, and therefore cannot bill for the D2D communication.

The present invention has been made in view of such circumstances and an objective thereof is to provide a billing system, a billing apparatus, and a billing method capable of billing for device-to-device direct communication (D2D communication) performed using a radio access network such as LTE.

A first feature of the present invention is summarized as a billing system including: a radio communication terminal configured to be able to perform direct communication with another radio communication terminal without involving a radio access network; and a billing apparatus configured to manage billing for the direct communication. Here, the radio communication terminal includes a billing-related information transmission unit configured to send the billing apparatus billing-related information to be used to bill for the direct communication, and the billing apparatus includes a billing-related information acquisition unit configured to acquire the billing-related information from the radio communication terminal, and a billing information generation unit configured to generate billing information on the direct communication, based on the billing-related information acquired by the billing-related information acquisition unit.

A second feature of the present invention is summarized as a billing apparatus which manages billing for direct communication performed between a radio communication terminal and another radio communication terminal without involving a radio access network, the billing apparatus including: a billing-related information acquisition unit configured to acquire billing-related information to be used to bill for the direct communication from the radio communication terminal; and a billing information generation unit configured to generate billing information on the direct communication, based on the billing-related information acquired by the billing-related information acquisition unit.

A third feature of the present invention is summarized as a billing method for managing billing for direct communication performed between a radio communication terminal and another radio communication terminal without involving a radio access network, the method including the steps of: acquiring billing-related information to be used to bill for the direct communication from the radio communication terminal; and generating billing information on the direct communication, based on the billing-related information acquired.

BRIEF DESCRIPTION OF THE DRAWINGS

FIG. 2 is a functional block configuration diagram of a terminal 400A according to the embodiment of the present invention.

FIG. 3 is a functional block configuration diagram of a billing apparatus 200 according to the embodiment of the present invention.

FIG. 4 is a diagram showing a communication sequence in which the terminals 400A, 400B perform direct communication based on broadcast information, according to the embodiment of the present invention.

FIG. 5 is a diagram showing a flow of billing operation performed by the billing apparatus 200 according to the embodiment of the present invention (Operation Example 1).

FIG. 6 is a diagram showing a flow of billing operation performed by the billing apparatus 200 according to the embodiment of the present invention (Operation Example 2).

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of the Radio Communication System

Figure 1:
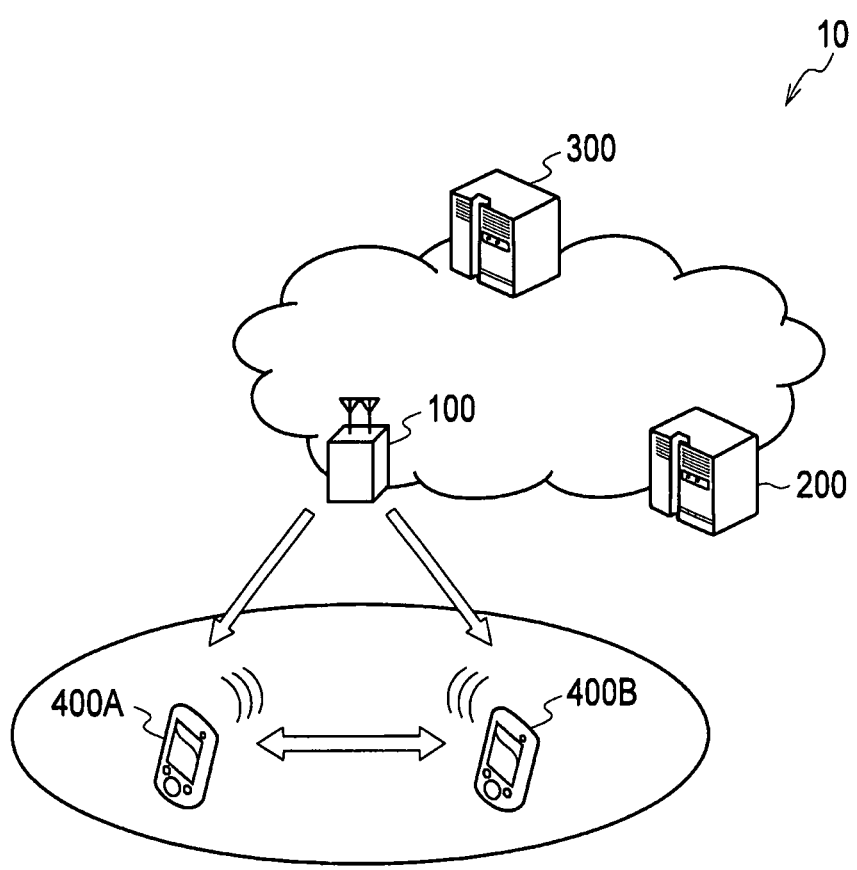
FIG. 1 is an overall schematic configuration diagram of a radio communication system 10 according to an embodiment of the present invention.

FIG. 1 is an overall schematic configuration diagram of a radio communication system 10 according to this embodiment. As shown in FIG. 1, the radio communication system 10 includes a radio base station 100, a billing apparatus 200, a communication control apparatus 300, and multiple radio communication terminals 400A, 400B (called terminals 400A, 400B hereinbelow).

The radio base station 100 performs operation conforming to a radio access technology (RAT) standardized by 3GPP, e.g., Long Term Evolution (LTE). In this embodiment, the radio base station 100 controls direct communication between the terminals 400A, 400B. More specifically, the radio base station 100 controls the direct communication by causing the radio base station 100 to transmit: broadcast information indicating whether or not to permit communication performed between the terminal 400A and the terminal 400B without involving the radio base station 100, i.e., without involving the radio access network; and configuration information a communication environment necessary for the direct communication. Note that the broadcast information for controlling direct communication between the terminal 400A and the terminal 400B may be broadcasted separately from multiple radio base stations, e.g., the radio base station 100 and another radio base station (not shown).

In this way, in the radio communication system 10, direct communication between the terminal 400A and the terminal 400B is permitted based on the broadcast information from the radio access network side. In addition, when it is based on broadcast information from another radio base station (not shown), for example, direct communication may be permitted based on the broadcast information from the other radio base station even in an area not covered by the radio base station 100.

The billing apparatus 200 manages billing in accordance with communication performed between the terminals 400A, 400B. In this embodiment, specifically, the billing apparatus 200 manages billing for device-to-device direct communication (D2D communication) performed between the terminals 400A, 400B, or particularly, manages billing for direct communication between the terminal 400A and the terminal 400B.

The communication control apparatus 300 controls communication performed by the terminals 400A, 400B. More specifically, the communication control apparatus 300 controls communication performed by the terminals 400A, 400B by responding to broadcast information transmitted from the radio base station 100 and to a communication request transmitted from the terminals 400A, 400B. The communication control apparatus 300 may be, e.g., a mobility control apparatus (MME), a policy control apparatus (PCRF), a subscriber management server (HSS), or the like.

The terminal 400A and the terminal 400B are each a User Equipment (UE) configured to perform radio communication conforming to a radio access technology such as LTE. The terminal 400A (400B) can communicate with the terminal 400B (400A) via the radio base station 100 and can communicate directly with the terminal 400B (400A) without involving a radio access network. More specifically, the terminals 400A, 400B each determine based on the broadcast information broadcasted by the radio base station 100 whether direct communication can be performed or not, and performs the direct communication at a predetermined or any timing. Note that, for this determination, information notified of by the communication control apparatus 300 (e.g., direct-communication permission notification) may be added as an element of determination.

(2) Functional Block Configuration of the Radio Communication System

Next, the functional block diagram of the radio communication system 10 is described. Specifically, functional block configurations of the terminal 400A (400B) and the billing apparatus 200 are described. FIG. 2 is a functional block configuration diagram of the terminal 400A, and FIG. 3 is a functional block configuration diagram of the billing apparatus 200. In this embodiment, the terminal 400A (400B) and the billing apparatus 200 form a billing system.

(2.1) Terminal 400A

As shown in FIG. 2, the terminal 400A includes a broadcast information reception unit 410, a direct communication execution unit 420, and a billing-related information transmission unit 430. Note that the terminal 400B also has a similar functional block to that of the terminal 400A. In addition, if the billing apparatus 200 can acquire the start and end of direct communication by a different means, the terminal 400A does not have to include the billing-related information transmission unit 430.

The broadcast information reception unit 410 receives broadcast information broadcasted by the radio base station 100. Specifically, the broadcast information reception unit 410 receives: broadcast information indicating whether or not communication is permitted to be performed between the terminal 400A and the terminal 400B; and broadcast information containing configuration information a communication environment necessary for the direct communication.

The establishment information includes a frequency band allowed for the direct communication, the radio field intensity of radio signals, timing of origination by the terminal 400A, 400B (timing at which the direct communication is allowed to be performed), and the like. Note that the radio field intensity is desirably of a degree not causing interference to the radio communication between the radio base station and the terminals (radio base station 100 and the terminals 400A, 400B for example). The radio field intensity may be changed according to the distance between the terminal 400A and the terminal 400B. For example, SIB (System Information Block) can be used as the broadcast information.

The direct communication execution unit 420 starts direct communication with the terminal 400B based on the broadcast information received from the radio base station 100. More specifically, the direct communication execution unit 420 establishes a communication environment necessary for the direct communication, based on the establishment information on the direct communication contained in the broadcast information received by the broadcast information reception unit 410.

The billing-related information transmission unit 430 sends the billing apparatus 200 billing-related information used for billing for the direct communication between the terminal 400A and the terminal 400B. Specifically, the billing-related information transmission unit 430 sends the billing apparatus 200 billing-related information containing the date and time of the start of the direct communication and the date and time of the end of the direct communication. More specifically, billing-related information transmission unit 430 reports the start time and end time of the device-to-device direct communication to the billing apparatus 200. The billing apparatus 200 generates billing data for the terminal 400A and/or the terminal 400B based on the reported billing-related information. Note that a method for the billing may be the same as a conventional method, such as the time spent from the start to end of the direct communication or a fixed monthly charge.

In addition, the billing-related information transmission unit 430 can send the billing apparatus 200 billing-related information containing information indicating the intensity of radio signals used in the direct communication. Alternatively, the billing-related information transmission unit 430 can send the billing apparatus 200 billing-related information containing the amount of data in the direct communication. Further, the billing-related information transmission unit 430 can send the billing apparatus 200 billing-related information containing the number of radio communication terminals participating in the direct communication, i.e., the number of radio communication terminals connected at the same time.

The billing-related information transmission unit 430 can also send the billing apparatus 200 billing-related information containing information on the communication type of the direct communication (e.g., VoIP communication, emergency information, or high-priority information). Further, the billing-related information transmission unit 430 can send the billing apparatus 200 billing-related information containing a subscriber to be billed (e.g., billing to an originating subscriber (terminal), billing to a terminating subscriber, or fair billing to both of the originating and terminating subscribers) or a reason for staring the direct communication (e.g., connection to the network has failed a predetermined number of times). In this case, the billing-related information further contains identifies of the originating and terminating subscribers (such as telephone numbers, IMEIs (International Mobile Equipment Identifiers), or IMSI (International Mobile Subscriber Identities).

The billing-related information transmission unit 430 may send the billing apparatus 200 the above-described billing-related information in bulk on a monthly, weekly, or daily basis.

(2.2) Billing Apparatus 200

As shown in FIG. 3, the billing apparatus 200 includes a billing-related information acquisition unit 210 and a billing information generation unit 220.

The billing-related information acquisition unit 210 acquires the billing-related information from the terminal 400A (400B). Specifically, the billing-related information acquisition unit 210 can acquire the billing-related information at timings when the direct communication starts and ends from the terminal 400A, or acquire the billing-related information in bulk on a monthly, weekly, or daily basis.

The billing information generation unit 220 generates billing information on the direct communication based on the billing-related information acquired by the billing-related information acquisition unit 210. The billing information generation unit 220 generates billing data for the terminal 400A and/or the terminal 400B based on these pieces of billing-related information.

Specifically, the billing information generation unit 220 can generate billing information in accordance with the duration of the direct communication, based on a notification of the start of the direct communication and a notification of the end of the direct communication.

In addition, the billing information generation unit 220 can also generate billing information in accordance with the intensity of radio signals used in the direct communication. Alternatively, the billing information generation unit 220 can generate billing information in accordance with the amount of data in the direct communication. Further, the billing information generation unit 220 can also generate billing information in accordance with the number of radio communication terminals participating in the direct communication.

Moreover, the billing information generation unit 220 can also determine a subscriber (terminal) to be billed, based on the communication type information contained in the billing-related information, and generate billing information for the originating end, the terminating end, or both. Alternatively, the billing information generation unit 220 may determine whether billing occurs should occur or not and generate the billing information. Note that, in the above-described generation of billing information, the billing information generation unit 220 may generate the billing information by combining multiple pieces of billing-related information.

(3) Operation of the Radio Communication System

Next, operation of the above-described radio communication system 10 is described. Specifically, a description is given of a communication sequence for direct communication by the terminals 400A, 400B and a flow of billing operation by the billing apparatus 200.

(3.1) Communication Sequence for Direct Communication by the Terminals 400A, 400B FIG. 4 shows a communication sequence in which the terminals 400A, 4003 perform direct communication based on the broadcast information.

As shown in FIG. 4, the radio base station 100 sets an area in which the terminals 400A, 400B can perform direct communication (S10). Specifically, the radio base station 100 can set an area where direct communication can be performed, on a cell basis, a sector basis, a tracking-area basis, a network basis, or the like, as described above. It is assumed herein that the direct communication can be performed in a cell formed by the radio base station 100.

The radio base station 100 sends broadcast information containing information for establishing direct communication (such as a frequency band, the intensity of radio signals, and the like) toward the cell formed by the radio base station 100 (S20).

The terminals 400A, 400B store the establishment information contained in the received broadcast information (S30), and establish a communication environment necessary for the direct communication based on the establishment information (S40).

Further, the terminal 400A sends the radio base station 100 a request to start direct communication with the terminal 400B (S50). The radio base station 100 determines whether or not the terminals 400A, 400B are camping on the area where the direct communication is possible (S60). It is assumed herein that it is determined that the direct communication is possible. The radio base station 100 transfers the request to start direct communication to the communication control apparatus 300 (S65).

The communication control apparatus 300 sends the terminal 400A a direct-communication permission notification (containing timing to execute the direct communication) via the radio base station 100 (S70). After the permission notification, the terminal 400A starts the direct communication with the terminal 400B at any timing or the execution timing contained in the permission notification (S80).

Meanwhile, to manage billing for the direct communication imposed on the terminal 400A (or the terminal 400B), the radio base station 100 notifies the billing apparatus 200 via the communication control apparatus 300 that the terminal 400A and the terminal 400B are in a state where they can perform direct communication (S90).

When the direct communication with the terminal 400B ends, the terminal 400A notifies the radio base station 100 that the direct communication has ended (S100). To manage billing for the direct communication imposed on the terminal 400A (or the terminal 400B), the radio base station 100 notifies the billing apparatus 200 via the communication control apparatus 300 that the direct communication between the terminal 400A and the terminal 400B has ended (S110).

The billing apparatus 200 generates billing information based on: the notification of completion of direct-communication permission notification in Step S90 indicating that the terminal 400A has successfully been notified of the direct-communication permission notification; and billing-related information contained in the notification of the end of the direct communication in Step S100 (S120).

In the communication sequence described above, if the radio base station 100 cannot communicate with the communication control apparatus 300 or the billing apparatus 200, the radio base station 100 may send the terminal 400A the "direct-communication permission notification" in S70 based on predetermined information set in the radio base station 100, such as operator policies defined by the telecommunications carrier, without communicating with the communication control apparatus 300 or the billing apparatus 200. In this case, some or all of S65, S90, S110, and S120 are omitted from the sequence. In addition, in this case, the radio base station 100 may retain information related to communication by the terminal 400A and notify the billing apparatus 200 of the information when communication with the communication control apparatus 300 or the billing apparatus 200 is restored. Further, the above information can be transmitted via the communication control apparatus 300.

(3.2) Flow of Billing Operation by the Billing Apparatus 200

Figure 7:
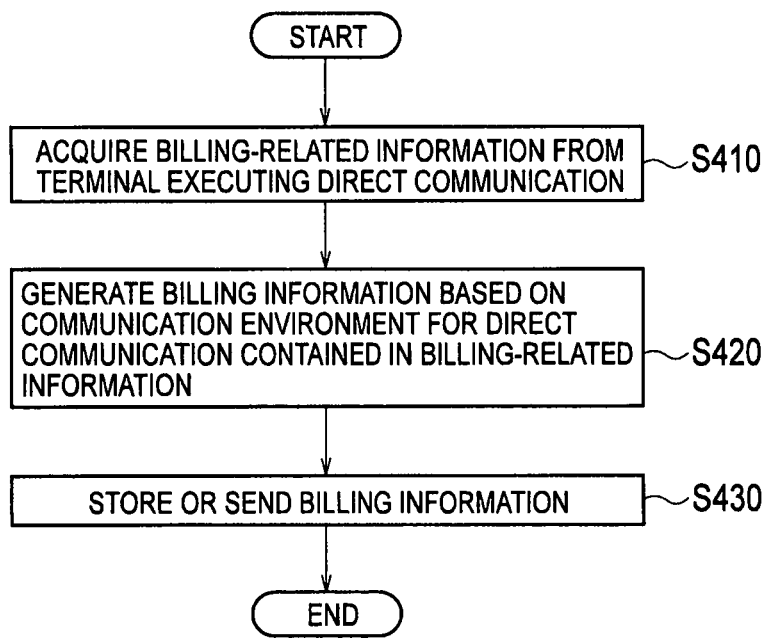
FIG. 7 is a diagram showing a flow of billing operation performed by the billing apparatus 200 according to the embodiment of the present invention (Operation Example 3).

FIGS. 5 to 7 show flows of billing operation by the billing apparatus 200 (Operation Examples 1 to 3, respectively).

(3.2.1) Operation Example 1

As shown in FIG. 5, the billing apparatus 200 acquires billing-related information from a terminal executing direct communication (e.g., the terminal 400A) (S210).

The billing apparatus 200 generates billing information based on a notification of the start of direct communication and a notification of the end thereof contained in the billing-related information acquired (S220). Specifically, the billing apparatus 200 generates billing information in accordance with the duration of communication, based on the date and times of acquiring the start notification and the end notification.

The billing apparatus 200 stores the generated billing information therein or sends it to other apparatus (S230).

(3.2.2) Operation Example 2

Processing of Steps S310 and S330 shown in FIG. 6 are the same as S210 and S230 of Operation Example 1. The billing apparatus 200 generates billing information based on the amount of data in the direct communication or the number of radio communication terminals participating in the direct communication, contained in the billing-related information acquired (S320).

More specifically, the billing apparatus 200 generates billing information in accordance with the data amount or the number of terminals. Note that the billing apparatus 200 may generate billing information based on one of the data amount and the number of terminals.

(3.2.3) Operation Example 3

Processing of Steps S410 and S430 shown in FIG. 7 are the same as S210 and S230 of Operation Example 1. The billing apparatus 200 generates billing information based on a communication environment for the direct communication contained in the billing-related information acquired (S420).

More specifically, the billing apparatus 200 generates billing information in accordance with the intensity of radio signals transmitted by a terminal executing the direct communication toward a target terminal, or more specifically, the radio field intensity.

Note that besides the intensity of radio signals, the billing apparatus 200 may generate billing information in accordance with a frequency band used by the radio signals, or billing information in accordance with the communication type information as described above.

(4) Advantageous Effects

According to the radio communication system 10, the terminal 400A (or the terminal 400B, the same applies below) sends the billing apparatus 200 billing-related information which is used to bill for direct communication. Then, the billing apparatus 200 generates information on billing for the direct communication, based on the billing-related information acquired from the terminal 400A. Specifically, the billing apparatus 200 generates billing information on direct communication, based on any one of or a combination of (i) a notification of the start of the direct communication and a notification of the end of the direct communication, (ii) information indicating the intensity of radio signals used in the direct communication, (iii) the amount of data in the direct communication, and (iv) the number of radio communication terminals participating in the direct communication. The billing apparatus 200 can also generate billing information in accordance with communication type information.

For this reason, when device-to-device direct communication (D2D communication) is executed using a radio access network such as LTE, billing for the device-to-device direct communication can be imposed. In this embodiment, flexible billing according to the status of the direct communication can be achieved by selectively using the above-described pieces of information (i) to (iv) as the billing-related information or by using the communication type information. In particular, the billing-related information can be generated in accordance with the intensity of radio signals, enabling achievement of fair billing in accordance with the distance range in which the direct communication is possible.

Further, during execution of the direct communication, a radio access network owned by a telecommunications carrier and a communication line on a core network are not used, and various apparatuses such as a radio base station and a switch are not used, either. Hence, the telecommunications carrier providing the direct communication can construct and maintain its network inexpensively compared to conventional capital investment and maintenance for a network capable of withstanding high traffic, and also can introduce a flexible billing structure, such as making a billing structure for various types of direct communication less expensive than regular communication using the network of the telecommunications carrier.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, although the above embodiment of the present invention describes direct communication between multiple terminals (terminals 400A, 400B) subscribing to the same telecommunications carrier, the direct communication may be performed between terminals subscribing to different telecommunications carriers (called interconnection direct communication hereinbelow). In this case, broadcast information (establishment information) is notified also by a radio base station of the other telecommunications carrier (not shown), and the communication control apparatus 300 and the billing apparatus 200 cooperate with a communication control apparatus and a billing apparatus of the other telecommunications carrier (not shown). Thereby, permission for the direct communication between the terminals subscribing to different telecommunications carriers and collection of billing-related information on the direct communication are carried out. Further, in this case, a billing structure or a billing method suitable for the interconnection direct communication may be employed. Moreover, the multiple telecommunications carriers may share a billing apparatus.

In addition, for example, the above-described embodiment of the present invention describes an example where the terminals 400A, 400B perform direct communication based on the establishment information on direct communication transmitted from the radio base station 100 (see FIG. 4). However, the radio access network may permit direct communication in response to a request to start the direct communication from the terminal 400A (400B).

Figure 8:
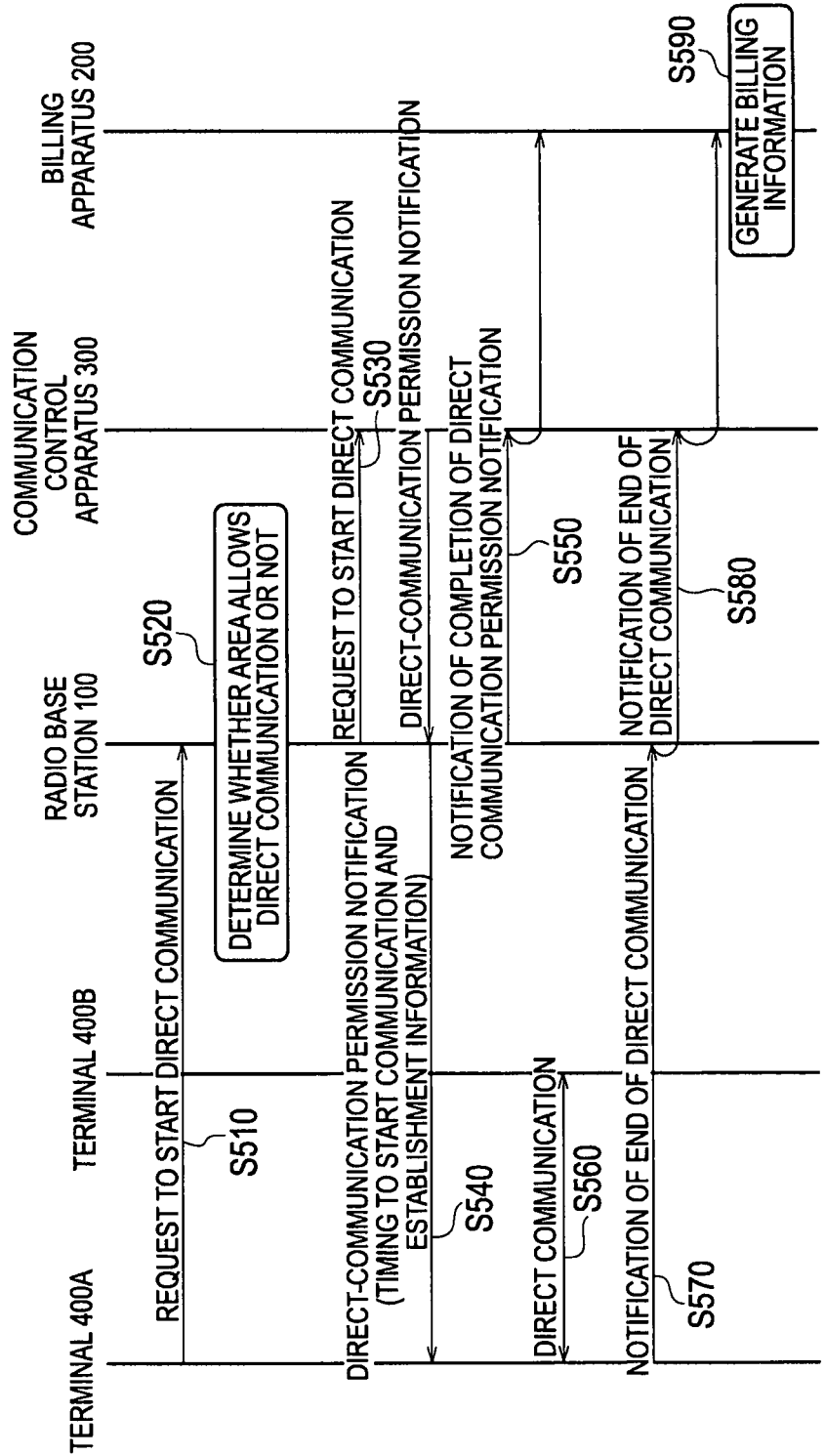
FIG. 8 is a diagram showing a communication sequence in which the terminals 400A, 400B perform direct communication based on broadcast information, according to a modification of the present invention.

FIG. 8 shows a communication sequence in which the terminals 400A, 400B perform direct communication, according to a modification of the present invention. As shown in FIG. 8, the terminal 400A sends the radio base station 100 a request to start direct communication with the terminal 400B (S510). The radio base station 100 determines whether or not the terminal 400A and the terminal 400B are located in an area where the direct communication is possible (S520), and if the direct communication is possible, transfers the request to start direct communication to the communication control apparatus 300 (S530). Operation of S540 and following steps is the same as operation of S70 and following steps shown in FIG. 4.

Thus, also in the modification shown in FIG. 8, the billing apparatus 200 generates billing information based on billing-related information contained in a notification of the start of direct communication and a notification of the end thereof (S590).

As described above, the present invention naturally includes various embodiments which are not described herein. Accordingly, the technical scope of the present invention should be determined only by the matters to define the invention in the scope of claims regarded as appropriate based on the description.

The features of the present invention may also be expressed as follows. A first feature of the present invention is summarized as a billing system including: a terminal 400A (a radio communication terminal) configured to be able to perform direct communication with a terminal 400B (another radio communication terminal) without involving a radio access network; and a billing apparatus 200 configured to manage billing for the direct communication. Here, the radio communication terminal includes a billing-related information transmission unit 430 configured to send the billing apparatus billing-related information to be used to bill for the direct communication, and the billing apparatus 210 includes a billing-related information acquisition unit configured to acquire the billing-related information from the radio communication terminal, and a billing information generation unit 220 configured to generate billing information on the direct communication, based on the billing-related information acquired by the billing-related information acquisition unit.

In the first feature of the present invention, the billing-related information transmission unit may send the billing apparatus the billing-related information containing a notification of start of the direct communication and a notification of end of the direct communication.

In the first feature of the present invention, the billing-related information transmission unit may send the billing apparatus the billing-related information containing information indicating an intensity of a radio signal used in the direct communication.

In the first feature of the present invention, the billing-related information transmission unit may send the billing apparatus the billing-related information containing an amount of data in the direct communication.

In the first feature of the present invention, the billing-related information transmission unit may send the billing apparatus the billing-related information containing the number of radio communication terminals participating in the direct communication.

A second feature of the present invention is summarized as a billing apparatus which manages billing for direct communication performed between a radio communication terminal and another radio communication terminal without involving a radio access network, the billing apparatus including: a billing-related information acquisition unit configured to acquire billing-related information to be used to bill for the direct communication from the radio communication terminal; and a billing information generation unit configured to generate billing information on the direct communication, based on the billing-related information acquired by the billing-related information acquisition unit.

A third feature of the present invention is summarized as a billing method for managing billing for direct communication performed between a radio communication terminal and another radio communication terminal without involving a radio access network, the method including the steps of: acquiring billing-related information to be used to bill for the direct communication from the radio communication terminal; and generating billing information on the direct communication, based on the billing-related information acquired.

Note that the entire content of Japanese Patent Application No. 2012-100273 (filed on Apr. 25, 2012) is incorporated by reference in the present specification.

INDUSTRIAL APPLICABILITY

According to the aspects of the present invention, what can be provided are a billing system, a billing apparatus, and a billing method capable of billing for device-to-device direct communication (D2D communication) performed using a radio access network such as LTE.

EXPLANATION OF THE REFERENCE NUMERALS 10 radio communication system
100 radio base station
200 billing apparatus
210 billing-related information acquisition unit
220 billing information generation unit
300 communication control apparatus
400A, 400B terminal
410 broadcast information reception unit
420 direct communication execution unit
430 billing-related information transmission unit

The invention claimed is:

1. A billing system comprising:
a radio communication terminal configured to be able to perform direct communication with another radio communication terminal without involving a radio access network;
a base station configured to transmit broadcast information to the radio communication terminal and the other radio communication terminal indicating whether or not the direct communication is permitted;
a billing apparatus configured to manage billing for the direct communication, wherein
the radio communication terminal includes a billing-related information transmitter configured to send the billing apparatus billing-related information to be used to bill for the direct communication in response to the broadcast information indicating that the direct communication is permitted, wherein the broadcast information contains establishment information including a frequency band allowed for the direct communication, an intensity of radio signals, and a timing at which the direct communication is allowed to be performed,
wherein the billing apparatus comprises:
a billing-related information receiver configured to acquire the billing-related information from the radio communication terminal, and
a processor configured to generate billing information on the direct communication, based on the billing-related information acquired by the billing-related information receiver,
wherein the billing-related information contains information on communication type of the direct communication and the communication type includes VoIP communication.

2. The billing system according to claim 1, wherein the billing-related information transmitter sends the billing apparatus the billing-related information containing a notification of start of the direct communication and a notification of end of the direct communication.

3. The billing system according to claim 1, wherein the billing-related information transmitter sends the billing apparatus the billing-related information containing information indicating an intensity of a radio signal used in the direct communication.

4. The billing system according to claim 1, wherein the billing-related information transmitter sends the billing apparatus the billing-related information containing an amount of data in the direct communication.

5. The billing system according to claim 1, wherein the billing-related information transmitter sends the billing apparatus the billing-related information containing a number of radio communication terminals participating in the direct communication.

6. A billing apparatus which manages billing for direct communication performed between a radio communication terminal and another radio communication terminal, wherein the radio communication terminal and the other radio communication terminal receive, from a base station, broadcast information indicating whether or not direct communication is permitted; the billing apparatus comprising:
a billing-related information receiver configured to acquire the billing-related information to be used to bill for the direct communication from the radio communication terminal in response to the broadcast information indicating that the direct communication is permitted, wherein the broadcast information contains establishment information including a frequency band allowed for the direct communication, an intensity of radio signals, and a timing at which the direct communication is allowed to be performed; and
a processor configured to generate billing information on the direct communication, based on the billing-related information acquired by the billing-related information receiver, wherein the billing-related information contains information on communication type of the direct communication and the communication type includes VoIP communication, wherein the radio communication terminal includes a billing-related information transmitter that sends the billing apparatus the billing-related information, wherein the radio communication terminal performs direct communication with the another radio communication terminal without involving a radio access network.

7. A billing method for managing billing for direct communication performed between a radio communication terminal and another radio communication terminal, wherein the radio communication terminal and the other radio communication terminal receive, from a base station, broadcast information indicating whether or not the direct communication is permitted; the method comprising the steps of:

acquiring billing-related information to be used to bill for the direct communication from the radio communication terminal in response to the broadcast information indicating that the direct communication is permitted, wherein the broadcast information contains establishment information including a frequency band allowed for the direct communication, an intensity of radio signals, and a timing at which the direct communication is allowed to be performed; and generating billing information on the direct communication, based on the billing-related information acquired, wherein the billing-related information contains information on communication type of the direct communication and the communication type includes VoIP communication, wherein the radio communication terminal includes a billing-related information transmitter that sends the billing-related information, and wherein the radio communication terminal performs direct communication with the another radio communication terminal without involving a radio access network.

* * * * *